(12) United States Patent
Feldman et al.

(10) Patent No.: US 9,416,052 B2
(45) Date of Patent: *Aug. 16, 2016

(54) CONCRETE MATERIALS WITH MODIFIED RHEOLOGY, METHODS OF MAKING, AND USES THEREOF

(71) Applicant: Active Minerals International, LLC, Sparks, MD (US)

(72) Inventors: Steven B. Feldman, Cockeysville, MD (US); Robert J. Purcell, Jr., Baltimore, MD (US); Peter Tutbury, Brisbane (AU); Paul Fendley, Cockeysville, MD (US); Dennis C. Parker, Sparks, MD (US); Rudolph Coetzee, Paxton, MD (US)

(73) Assignee: ACTIVE MINERALS INTERNATIONAL, LLC, Sparks, MD (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/266,748

(22) Filed: Apr. 30, 2014

(65) Prior Publication Data

US 2015/0315078 A1 Nov. 5, 2015

(51) Int. Cl.
| | |
|---|---|
| *C04B 14/10* | (2006.01) |
| *C04B 28/04* | (2006.01) |
| *C04B 28/02* | (2006.01) |
| *C04B 14/06* | (2006.01) |
| *C04B 28/10* | (2006.01) |
| C04B 111/00 | (2006.01) |

(52) U.S. Cl.
CPC .............. *C04B 28/04* (2013.01); *C04B 14/06* (2013.01); *C04B 28/021* (2013.01); *C04B 28/10* (2013.01); C04B 2111/00103 (2013.01); C04B 2111/00146 (2013.01)

(58) Field of Classification Search
CPC ................. C04B 28/04; C04B 14/10
See application file for complete search history.

(56) References Cited

U.S. PATENT DOCUMENTS

| | | | | |
|---|---|---|---|---|
| 3,197,317 A | * | 7/1965 | Patchen | ............... C04B 14/102 106/718 |
| 4,778,526 A | | 10/1988 | Cassens | |
| 4,931,098 A | | 6/1990 | Danielssen et al. | |
| 5,034,160 A | * | 7/1991 | Kindt | ...................... C04B 28/02 106/18.12 |

(Continued)

OTHER PUBLICATIONS

International Search Report and Written Opinion for corresponding International PCT Application No. PCT/US2015/27116, dated Jul. 8, 2015.

*Primary Examiner* — Paul Marcantoni
(74) *Attorney, Agent, or Firm* — Hauptman Ham, LLP (57) ABSTRACT

A composition, in the form of a concrete, cement paste, mortar or intermediate thereof, comprising one or more cementitious binder materials present in an amount ranging from 0.5% to 75% by weight of the composition, attapulgite present in an amount ranging from 0.01% to 1.00% by weight of the composition, and optionally water. Although subject to many uses, in some embodiments, the composition is suitable for applications in need or desire of self-consolidating concretes (SCCs), precast concrete, shotcrete, and the like. Although makeable by multiple methods, in some embodiments, the composition is made by mixing the component ingredients. In some embodiments, the composition has one or more properties chosen from superior aggregate suspension, eliminated segregation, improved workability, improved flowability, improved pumpability—or improved overall performance—of concretes.

20 Claims, 9 Drawing Sheets

(56) References Cited

U.S. PATENT DOCUMENTS

| | | |
|---|---|---|
| 5,154,771 A | 10/1992 | Wada et al. |
| 6,093,241 A * | 7/2000 | Alther ................... C04B 24/425 106/694 |
| 7,247,263 B2 | 7/2007 | Parker et al. |
| 2002/0038618 A1* | 4/2002 | Ayambem ........... C04B 24/2641 106/792 |
| 2005/0241537 A1 | 11/2005 | Hicks et al. |
| 2011/0217475 A1 | 9/2011 | Bonin et al. |
| 2012/0048466 A1* | 3/2012 | Eckert .................... C04B 28/02 156/336 |
| 2014/0135420 A1* | 5/2014 | Podlas ................ C04B 24/2623 523/122 |
| 2015/0239782 A1* | 8/2015 | Purcell, Jr. .............. C04B 14/00 166/305.1 |

\* cited by examiner

Figure 1

| | | |
|---|---|---|
| (cementitious binder+ water) + aggregate → | concrete | (1) |
| (cementitious binder+ water) + aggregate +AG → | concrete | (1a) |
| (cementitious binder+ water) + aggregate → | concrete + AG | (1b) |
| | | |
| cementitious binder+ water → | cement paste | (2) |
| cementitious binder+ water + AG → | cement paste | (2a) |
| cementitious binder+ water → | cement paste +AG | (2b) |
| | | |
| aggregate + cement paste → | concrete | (3) |
| aggregate + cement paste + AG → | concrete | (3a) |
| fine aggregate (sand) + cement paste → | concrete + AG | (3b) |
| | | |
| fine aggregate (sand) + cement paste → | mortar | (4) |
| fine aggregate (sand) + cement paste + AG → | mortar | (4a) |
| fine aggregate (sand) + cement paste → | mortar + AG | (4b) |
| | | |
| mortar + coarse aggregate (gravel) → | concrete | (5) |
| mortar + coarse aggregate (gravel) + AG → | concrete | (5a) |
| mortar + coarse aggregate (gravel) → | concrete + AG | (5b) |

AG is shorthand for attapulgite, such as Acti-Gel® 208

CONCRETE MATERIALS WITH MODIFIED RHEOLOGY, METHODS OF MAKING, AND USES THEREOF

FIELD

A composition, in the form of a concrete, cement paste, mortar or intermediate thereof, comprising one or more cementitious binder materials present in an amount ranging from 0.5% to 75% by weight of the composition, attapulgite present in an amount ranging from 0.01% to 4.00% by weight of the composition, and optionally water. Although subject to many uses, in some embodiments, the composition is suitable for applications in need or desire of self-consolidating concretes (SCCs), precast concrete, shotcrete, slip-form pavements and curbs, deep foundations (anti-washout), lightweight concretes, dry cast block, pipe, and hollowcore, Putze and plasters. Although makeable by multiple methods, in some embodiments, the composition is made by mixing the component ingredients. In some embodiments, the composition has one or more properties chosen from superior aggregate suspension, eliminated segregation, improved workability, improved flowability, improved pumpability—or improved overall performance—of concretes.

BACKGROUND

Each of the present inventors knows that concrete has many properties that make it a popular construction material. Proportions of ingredients, placement, and curing are needed in order for these properties to be desirable.

Each of the present inventors also knows that concrete is prepared by mixing cement, water, and aggregate together to make a workable paste. It is molded or placed as envisioned, consolidated, and then left to harden. The concrete (or specifically, the cementitious binder in it) uses moisture to hydrate and cure (harden). The strength of concrete can depend upon hydration.

It is to be understood that both the foregoing general description and the following detailed description are representative and explanatory only and are not restrictive of the invention, as claimed.

BRIEF DESCRIPTION OF THE DRAWINGS

The accompanying drawings, which are incorporated in and constitute a part of this specification, illustrate one (several) embodiment(s) of the invention and together with the description, serve to explain the principles of the embodiments described herein.

DESCRIPTION OF THE EMBODIMENTS

A composition comprises one or more cementitious binder materials present in an amount ranging from 0.5% to 75% by weight of the composition; at least one member chosen from attapulgite, a nonswelling nanoclay, present in an amount ranging from 0.01% to 4.00% by weight of the composition, sepiolite present in an amount ranging from 0.1% to 6% by weight of the composition, and palygorskite present in an amount ranging from 0.05% to 5% by weight of the composition; and optionally water. The composition is in the form of a concrete, cement paste, mortar, or intermediate thereof, i.e., the composition is in the form of a cement mix.

In some embodiments, the composition has a form suitable for suitable for applications in need or desire of self-consolidating concretes (SCCs), precast concrete, shotcrete, slip-form pavements and curbs, deep foundations (anti-washout), lightweight concretes, dry cast block, pipe, and hollowcore, Putze and plasters. In some embodiments, the composition has a form suitable for applications in need or desire of high-strength concrete, stamped concrete, high-performance concrete, ultra-high-performance concrete, self-consolidating concretes, rollcrete, class concrete, cork-cement composites, cellular concrete, asphalt concrete, rubberized concrete, and polymer concrete.

In some embodiments, the attapulgite is present in an amount ranging from 0.02% to 0.7% by weight of the composition. In some embodiments, the attapulgite is present in an amount ranging from 0.03% to 0.15% by weight of the composition. In some embodiments, the attapulgite is a nonswelling nanoclay.

In some embodiments, the attapulgite is from a locality chosen from Palygorskaya, near the Popovka River, Perm, Russia; Attapulgus, Decatur Co., Georgia; at Tafraout, Morocco; and in the Hyderabad deposit, Andhra Pradesh, India. In some embodiments, the attapulgite is from Attapulgus, Decatur Co., Georgia. In some embodiments, the attapulgite is associated with other non-attapulgite minerals, such as montmorillonite, dolomite, calcite, talc, chlorite, quartz, and the like. In some embodiments, the attapulgite is substantially free of non-attapulgite minerals. Such purified attapulgite is, in some embodiments, available by using the methods in U.S. Pat. Nos. 6,444,601 and 6,130,179, each of which is incorporated herein in its entirety.

In some embodiments, the attapulgite is a purified attapulgite. In some embodiments, the purified attapulgite is chosen from Acti-Gel® 208 available from ACTIVE MINERALS INTERNATIONAL, LLC.

In some embodiments, the purified attapulgite makes it possible to achieve a greater ability to suspend both cement particles and aggregate; reduce segregation and bleed, or improve flowability. In some embodiments, a composition comprising purified attapulgite has a viscosity that decreases under conditions of shear, which makes it possible to have improved workability or pumpability. After conditions of shear are removed, the composition quickly relaxes to have a higher yield stress and becomes a stable suspension.

In some embodiments, the sepiolite is present in an amount ranging from 0.2% to 3% by weight of the composition. In some embodiments, the sepiolite is present in amount ranging from 3% to 6% by weight of the composition.

In some embodiments, the sepiolite is from a locality chosen from in Little Cottonwood Canyon, Salt Lake Co., Utah; from Crestmore, Riverside Co., California; at Ash Meadows, Nye Co., Nevada; and Cerro Mercado, Durango, Mexico. In some embodiments, the sepiolite is associated with other non-sepiolite minerals, such as dolomite. In some embodiments, the sepiolite is substantially free of non-sepiolite minerals.

In some embodiments, the palygorskite is present in an amount ranging from 0.1% to 3% by weight of the composition. In some embodiments, the palygorskite is present in an amount ranging from 3% to 5% by weight of the composition.

In some embodiments, the palygorskite is from Attapulgus, Decatur County, Georgia. In some embodiments, the attapulgite is from a locality chosen from Palygorskaya, near the Popovka River, Perm, Russia; from China; Hekiman District, Malatya, Turkey; and in the Hyderabad deposit, Andhra Pradesh, India. In some embodiments, the attapulgite is associated with other non-attapulgite minerals, such as montmorillonite, dolomite, calcite, talc, chlorite, quartz, and the like. In some embodiments, the attapulgite is substantially free of non-attapulgite minerals.

In some embodiments, the one or more cementitious binder materials are present in an amount ranging from 0.5% to 75% by dry weight of the composition. In some embodiments, the amount ranges from 0.5% to 25% or from 25% to 50% by weight of the composition. In some embodiments, the amount ranges from greater than 50% to less than or equal to 60%. In some embodiments, the amount is greater than 60% by weight of the composition.

In some embodiments, the cementitious binder materials are chosen from those manufactured materials, such as lime and Portland cement. In some embodiments, cementitious binder materials are chosen from those processed by-products of manufacturing and power generation.

In some embodiments, the one or more cementitious binder materials are chosen from Portland cements such as ASTM C150 Type I, ASTM C150 Type I/II, or CSA A3001-03 Type GU.

In some embodiments, the one or more cementitious binder materials are chosen from lime. In some embodiments, the lime is chosen from ground limestones, calcined limestones, quicklime, and hydrated lime.

In some embodiments, the one or more cementitious binder materials further comprise one or more supplementary cementing materials.

In some embodiments, the one or more supplementary cementitious binder materials are chosen from ground granulated blast furnace slag (slag), fly ash (FA), natural and/or manufactured pozzolans, such as metakaolins.

In some embodiments, the one or more supplementary cementitious binder materials are chosen from granulated ground blast furnace slag (GGBFS), such as a pozzolanic by-product of iron manufacturing. In some embodiments, GGBFS includes coarse, rough textured particles which are composed of approximately 93-99% by weight of glass.

In some embodiments, the one or more supplementary cementitious binder materials are chosen from fly ash. In some embodiments, the fly ash is a very fine grained pozzolanic material (silica, alumina, and calcium oxides) and in the presence of both an activator and water will produce cementitious compounds (similar to those produced from the hydraulic and pozzolanic reactions of slag).

In some embodiments, the one or more cementitious binder materials further comprise one or more waste materials.

In some embodiments, the one or more waste materials are chosen from cement kiln dust (CKD), finely ground industrial waste glass and municipal waste glass.

In some embodiments, the one or more cementitious binder materials comprise one or more Portland cements, one or more supplementary cementitious materials, and one or more waste materials. In some embodiments, the one or more cementitious binder materials comprise one or more Portland cements and one or more supplementary cementitious binder materials.

In some embodiments, the one or more cementitious binder materials further comprises silica fume.

In some embodiments, the composition comprises water. Water, when mixed with cement mix, forms a paste that binds the aggregate together. Too much water reduces concrete strength, while too little will make the concrete unworkable. Concrete is typically workable so that it may be consolidated and shaped into different forms (i.e. walls, domes, etc.). Adding attapulgite present in an amount ranging from 0.01% to 4.00% by dry weight of the composition makes it possible to improve concrete strength and to improve workability of the cement mix. The amount of water is defined as a W/C ratio, in which W is the mass of the water, and C is the mass of the one or more cement binders. In some embodiments, the W/C ratio ranges from 0.20 to 0.70. In some embodiments, the W/C ratio ranges from 0.35 to 0.60 or from 0.40 to 0.50. In some embodiments, the W/C ratio ranges from 0.35 to 0.45 or from 0.20 to 0.30.

Water is obtainable from many sources. In some embodiments, the water is from sources of fresh water or sources of saline water. In some embodiments, the water is purified to improve consolidation of the cement mix.

In some embodiments, the water has a pH ranging from 2 to 13. In some embodiments, the pH ranges from 2 to 7 or from 4.5 to 9.5 or from 5.0 to 7.8 or from 7 to 13. In some embodiments, the pH is adjusted using a neutralizer.

In some embodiments, the neutralizer is selected from gypsum, hydrated lime, ammonium nitrate, and aluminum sulfate. In some embodiments, the neutralizer is chosen from sodium hydroxide, caustic soda, hydrated lime, shell meal, limestone, burned lime, dolomite, sugar beet lime, and calcium silicate. In some embodiments, the neutralizer is chosen from aluminum sulfate, calcium chloride, lime sulfur, ferric sulfate, sulfuric acid, sulfur, and gypsum. In some embodiments, the neutralizer is selected from gypsum, hydrated lime, ammonium nitrate, and aluminum sulfate.

In some embodiments, the composition further comprises one or more aggregates. Aggregates are mostly chemically inert, solid bodies held together by the cement or hardened cement paste or hardened mortar. Aggregates come in various shapes, sizes, and materials ranging from fine particles, such as sand, to large particles, such coarse rocks. The selection of an aggregate is determined, in part, by the desired characteristics of the cement mix. For example, the density of concrete is influenced by the density of the aggregate. Soft, porous aggregates can result in weak concrete with low wear resistance, while using hard aggregates can make strong concrete with a high resistance to abrasion. The aggregates are usually washed to remove any dust, silt, clay, organic matter, or other impurities that would interfere with the bonding reaction with the cement paste.

In some embodiment, the aggregates are chosen from fine or coarse aggregates. In some embodiments, the one or more aggregates are chosen from gravel, crushed rock, and sand. In some embodiments, the crushed rock is chosen from limestone and granite. In some embodiments, the one or more aggregates are chosen from vermiculite, ceramic spheres, perlite, expanded clay, shale, slate, crushed brick, crushed limestone, sand, river gravel, crushed recycled concrete, steel shot, iron shot, steel pellets, and iron pellets.

In some embodiments, the composition further comprises one or more admixtures. In some embodiments, the one or more admixtures are chosen from air entraining agents, plasticizers, retarding agents, accelerating agents, mineral admixtures, pigments, and corrosion inhibitors.

The air entraining agents, when present, are added in an amount sufficient to improve durability, to improve workability, to reduce bleeding, or to reduce freezing/thawing problems. In some embodiments, the air entraining agents are chosen from detergents.

The plasticizers, when present, are added in an amount sufficient to decrease water needed for workable concrete. In some embodiments, the plasticizers are chosen from lignosulfonate, sulfonated naphthalene formaldehyde condensate, sulfonated melamine formaldehyde condensate, acetone formaldehyde condensate, and polycarboxylate ethers.

The retarding agents, when present, are added in an amount sufficient to delay setting time, to add long term strength, or to offsets adverse high temperature weather. In some embodiments, the retarding agents are chosen from sugar, sucrose, sodium gluconate, glucose, citric acid, and tartaric acid.

The accelerating agents, when present, are added in an amount sufficient to speed up the setting time, to achieve an early strength, or to offset adverse low temperature weather. In some embodiments, the accelerating agents are chosen from calcium chloride, calcium dinitrate, and sodium nitrate.

The mineral admixtures, when present, are added in an amount sufficient to improve workability, plasticity, or strength. In some embodiments, the mineral admixtures are chosen from fly ash and silica fume.

The pigments, when present, are added in an amount sufficient to impart color. In some embodiments, the pigments are chosen from metal oxides.

The corrosion inhibitors, when present, are added in an amount sufficient to reduce the rate of corrosion of one or more reinforcements, e.g., steel bars.

In some embodiments, the composition further comprises one or more reinforcements. In some embodiment, the one or more reinforcements are chosen from steel reinforcing bars, steel fibers, glass fibers, and plastic fibers. The one or more reinforcements are useable to carry tensile loads.

In some embodiments, the composition has a slump flow ranging from 140 mm to 260 mm. In some embodiments, the slump flow ranges from 150 mm to 250 mm. In some embodiments, the slump flow ranges from 13 mm to 130 mm. In some embodiments, the slump ranges from 500 mm to 800 mm.

In some embodiments, the composition has a 7-day shear stiffness Unconfined Compressive Strength (UCS) ranging from 100 kPa to 600 kPa for binder contents of 3% and 7%, respectively, and 28-day UCS ranging from 250 kPa to 5 MPa for binder contents of 3% to 7%, respectively. In some embodiments, the shear stiffness uniaxial compressive strength ranges from 15 kPa to 4.5 MPa. In some embodiments, the shear stiffness uniaxial compressive strength ranges from 25 kPa to 5 MPa or from 50 kPa to 3.5 MPa. In some embodiments, the UCS is measured days after the composition is made. In some embodiments, the UCS is measured 1, 3, 7, 21, 28, or 56 days after the composition is made.

In some embodiments, the cement mix is in the form of a concrete, comprising attapulgite; one or more cement binders; one or more aggregates; optionally one or more admixtures; optionally one or more reinforcements; and water. For each named ingredient, any amount noted herein is possible.

In some embodiments, the cement mix is in the form of a dry intermediate to concrete, comprising attapulgite; one or more cement binders; one or more aggregates; optionally one or more admixtures; and optionally one or more reinforcements. For each named ingredient, any amount noted herein is possible.

In some embodiments, the cement mix in in the form of a cement paste, comprising, in the absence of a significant amount of one or more aggregates, attapulgite; one or more cement binders; optionally one or more admixtures; optionally one or more reinforcements; and water. For each named ingredient, any amount noted herein is possible.

In some embodiments, the cement mix is in the form of a dry intermediate to a cement paste, comprising: attapulgite; one or more cement binders; one or more aggregates; optionally one or more admixtures; and optionally one or more reinforcements. For each named ingredient, any amount noted herein is possible.

The dry intermediate to a cement paste is usable to mix with water to form a cement paste, which is hardenable to form a hardened cement paste or useable to from a mortar by adding, e.g., sand. For each named ingredient, any amount noted herein is possible.

In some embodiments, the cement mix is in the form of a mortar, comprising attapulgite; one or more cement binders; one or more aggregates; optionally one or more admixtures; and optionally one or more reinforcements. For each named ingredient, any amount noted herein is possible.

The composition is makeable by several methods. In some embodiments, the composition is made by mixing the ingredients.

Figure 1:
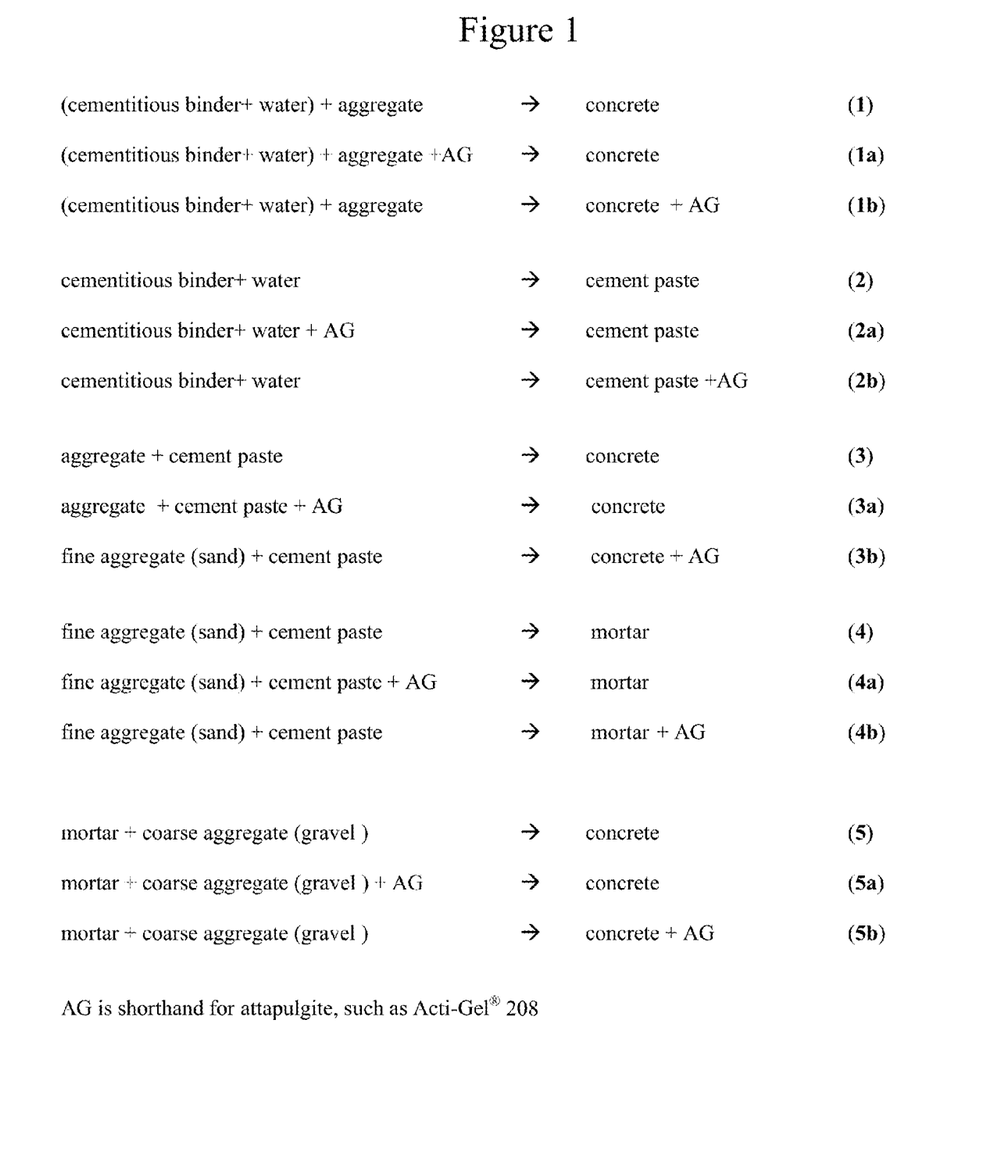
FIG. 1 shows a process for making the composition according to some embodiments.

FIG. 1 shows a process for making the composition according to some embodiments. For example, in some embodiment, the composition is made by mixing the ingredients via process (1a) or (1b) of FIG. 1. For example, concrete is makeable via process (1) in which the ingredients are shear mixed and mixed in a concrete mixer. The AG (shorthand for attapulgite), in some embodiments, is added with the reactants via process (1a). In some embodiments, the AG is added to the cement before hardening via process (1b).

In some embodiment, the composition is made by forming a cement paste via process (2), (2a) or (2b) of FIG. 1. For example, the one or more cement binders and water having a W/C ratio sometimes less than noted herein is mixed in a high-speed, shear-type mixer. The cement paste reactants, in some embodiments, further comprises one or more admixtures (not shown in (2), (2a), or (2b)) or AG, which independently are addable with the starting materials or resultant cement paste.

In some embodiments, the resultant cement paste of process (2a) or (2b) of FIG. 1 is allowed to harden.

In other embodiments, the resultant cement paste (2) of FIG. 1, (2a), or (2b) is thereafter blended with one or more aggregates and optionally water and final mixing is completed in concrete mixing equipment. In some embodiments, the step further comprises blending one or more admixtures or AG. In some embodiments, the process further comprises adding one or more admixtures (not shown in (3) of FIG. 1, (3a), or (3b) or AG, which independently are addable with the starting materials or resultant cement paste.

The order of addition of aggregate, AG, and admixture is optional. Sometimes coarse and fine aggregates are added simultaneously. Sometimes, the coarse aggregates are added before the fine aggregates or vice versa. For example, the resultant cement paste is then blended with one or more fine aggregates (e.g., sand) and optionally water to produce a mortar.

In some embodiments, the process further comprises adding one or more admixtures (not shown in (4) of FIG. 1), (4a), or (4b) or AG, which independently are addable with the starting materials or resultant cement paste.

Thereafter, the resultant mortar is then blended with one or more coarse aggregates (e.g., gravel) and optionally water to produce a concrete. See step (5) of FIG. 1.

Final mixing is, e.g., completed in concrete mixing equipment.

The AG is addable at any point before hardening of the concrete, paste or mortar. The AG is addable in multiple fractions at different steps in the reactions (1)-(5) of FIG. 1.

The one or more reinforcements are addable at any point before hardening of the concrete, paste or mortar. The one or more reinforcements is addable in multiple fractions at different steps in the reactions (1)-(5) of FIG. 1.

Although exemplified in terms of AG, the processes (1)-(5) of FIG. 1 are readily adaptable to include AG, sepiolite and/or palygorskite.

Shotcrete (also known by the trade name Gunite for dry mixtures) uses compressed air to shoot concrete onto (or into) a frame or structure. In some embodiments, shotcrete, dry-mix (gunite) includes placing concrete by a high pressure pneumatic projection from a nozzle. Shotcrete can be applied overhead or on vertical surfaces without forming. In some embodiments, shotcrete is used for concrete repairs or placement on bridges, transportation structure, viaducts, jersey barriers, road decks, dams, pools, and on other applications, which are typically costly or difficult. Shotcrete is, in some embodiments, applied against vertical soil or rock surfaces, or other applications lacking a formwork. In some embodiments, shotcrete is used for rock support, e.g., mountain tunneling. Shotcrete is, in some embodiments, used for minimizing seepage.

In some embodiments, a shotcrete method uses a dry mix or a wet mix. In some embodiments, the shotcrete, dry-mix (Gunite) method comprises adding a dry or substantially dry form of the composition noted herein into a machine and conveying the dry form of the composition, e.g., through a conduit, e.g., hoses, to an exit, e.g., a nozzle, with compressed air. The water sufficient for the hydration of the dry composition is added at the exit, e.g., the nozzle.

Figure 2A:
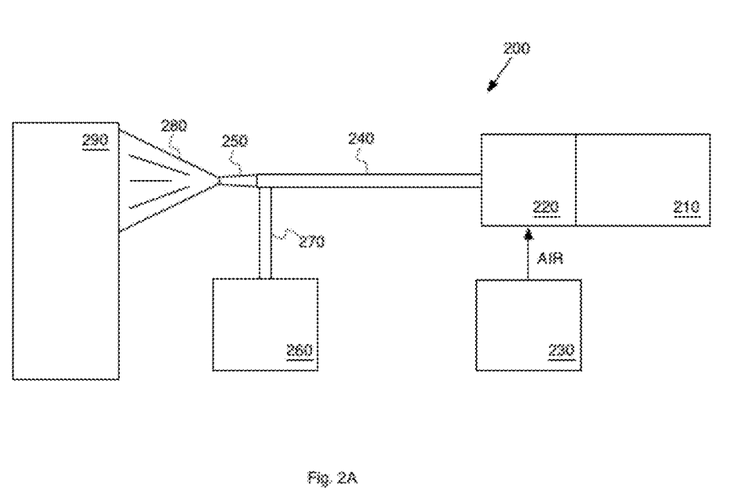
FIG. 2A shows an apparatus sufficient for shotcrete, dry-mix (gunite) according to some embodiments.

For example, FIG. 2A show an apparatus 200 sufficient for practicing a shotcrete, dry-mix (gunite) method. Mixer 210 is sufficient to receive and mix dry or substantially dry components of the composition described herein (dry-mixture). The dry-mixture is transported to gun 220, which is configured to receive air from compressor 230 and to build up pressure sufficient to make the dry-mixture travel through conduit 240 to nozzle 250. At or near nozzle 250, the dry-mixture is wetted by water (an optionally liquid additive) from a water source 260 via conduit 270. The wetted composition (dry-mixture plus water and additives added via conduit 270) is expelled in a pneumatic projection 280 to a site 290, where the wetted composition is allowed to consolidate. In the embodiment of FIG. 2A, the shotcrete, dry-mix (gunite) is a method in which most of the mixing water is added to the dry-mixture at or near the nozzle 250.

In some embodiments, the site 290 is vertical or substantially vertical. The compositions noted herein made it possible to form 8 to 16 inches thick of consolidated concrete. In some embodiments, the thickness ranges from 10 to 14 inches.

In some embodiments, the shotcrete, wet-mix method comprises mixing a composition described herein comprising water for hydration of the composition, pumping the hydrated composition through conduits, e.g., the hoses to an exit, e.g., a nozzle. At the exit, compressed air is added for spraying the composition.

Figure 2B:
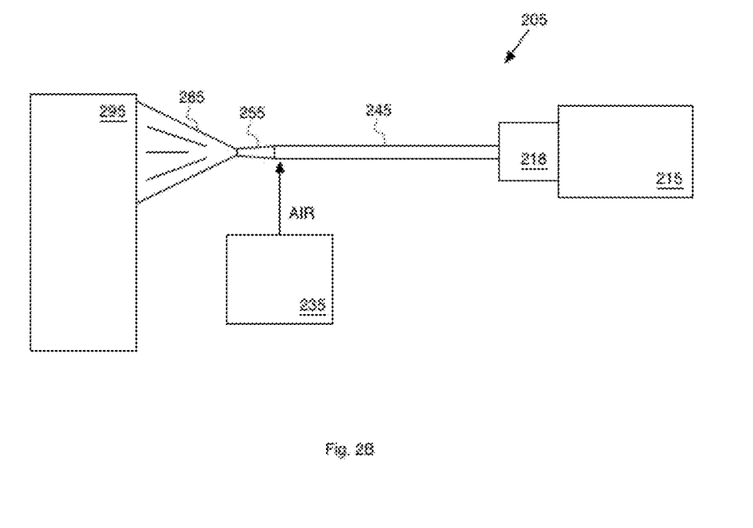
FIG. 2B shows an apparatus sufficient for shotcrete, wet-mix according to some embodiments.

For example, FIG. 2B shows an apparatus 205 sufficient for practicing a shotcrete, wet-mix method. Mixer 215 is configured to receive and optionally mix the components of the composition (hydrated form) described herein. The composition is transported to conduit 245 via pump 218. The composition traverses conduit 245 to a point (at or near nozzle 255) configured to receive air from compressor 235 and to build up pressure sufficient to propel the composition through nozzle 255. The composition is expelled in a pneumatic projection 285 to a site 295, where the composition is allowed to consolidate. In the embodiment of FIG. 2B, the shotcrete, wet-mix is a method in which the composition ingredients, including water, are mixed before introduction into the conduit 245.

Although practicable with the composition noted herein, the shotcrete, wet-mix or shotcrete, dry-mix (gunite), in some embodiments uses a composition shown in the following table.

| | |
|---|---|
| Cementitious binder materials | 18-20% by weight of dry components |
| Attapulgite, e.g., Acti-Gel ® 208 | 0.01 to 4.00% by weight of the composition |
| Aggregate Blend | ACI 506R-85 Table 2.1 Gradation No. 1, 2 or 3<br>ACI 506R Gradation 1 or 2<br>1:1 to about 1:3 by weight of cementitious binder materials |
| Silica fume | (>90% $SiO_2$) less than 10%<br>by weight of cementitious binder materials |
| Admixtures | Accelerator 2-5% by weight of cementitious binder materials<br>Optional air-entraining admixture<br>Optional water-reducing admixture<br>Optional high-range water-reducing admixture |
| Water | 0.300% by weight for shotcrete, dry-mix (gunite) (W/C less than 0.3);<br>0.35-0.45% by weight for shotcrete, wet-mix (W/C greater than or equal to 0.35 and less than or equal to 0.45) |
| Other | Barite<br>zeolite |

Although practicable with the composition having various forms noted herein, namely, concrete, cement paste, mortar, or intermediate thereof such as a cement mix, the shotcrete, wet-mix or shotcrete, dry-mix (gunite), in some embodiments, uses a composition in the form of cementitious gout. In some embodiments, the cementitious grout, being a pumpable, mortar-like material that hardens after application that is usable, e.g., for filling fissures and cavities by injection, includes hydraulic cementitious binder materials, fine (sand) aggregates and admixtures in a ratio of cement:fine sand ranging from 1:1.5 to 1:2; and attapulgite (such as Acti-Gel® 208) in an amount ranging from 0.01 to 4.00% by weight of the composition.

Based on the information known to the inventors and that described herein, a composition comprising purified attapulgite in the amount noted herein makes it possible to achieve several effects. These effects are not achievable by merely grinding or pulverizing attapulgite. Moreover, the purified attapulgite is resilient in operation and is resistant to mechanical or chemical degradation via processing.

EXAMPLE 1

Figure 3A:
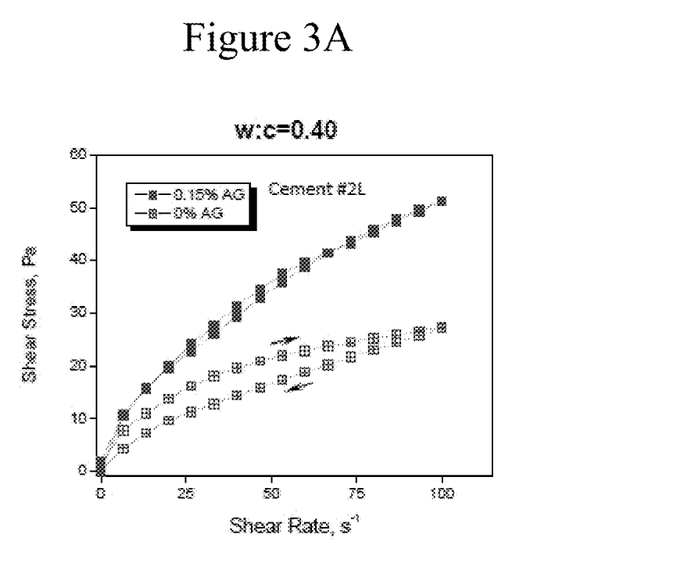
FIG. 3A shows the shear stress (Pa) v. shear rate ($s^{-1}$) for cement mix compositions.

This example helps show the flow curves for purified attapulgite (Acti-Gel® 208)-treated and untreated cement pastes. FIG. 3A shows the shear stress (Pa) v. shear rate ($s^{-1}$) for a cement mix compositions (a Type I/IIa cement from Lehigh Cement Co., Leeds, AL plant) containing 0.15% purified attapulgite (solid boxes) and no attapulgite (open boxes). The W/C ratio is 0.4. Considerable hysteresis in the untreated sample indicates instability of the paste. The Act-Gel®208 treated concrete shows uniform behavior between increasing and decreasing shear indicating not only a greater mix stability but also a better ability to minimize segregation and bleed.

Figure 3B:
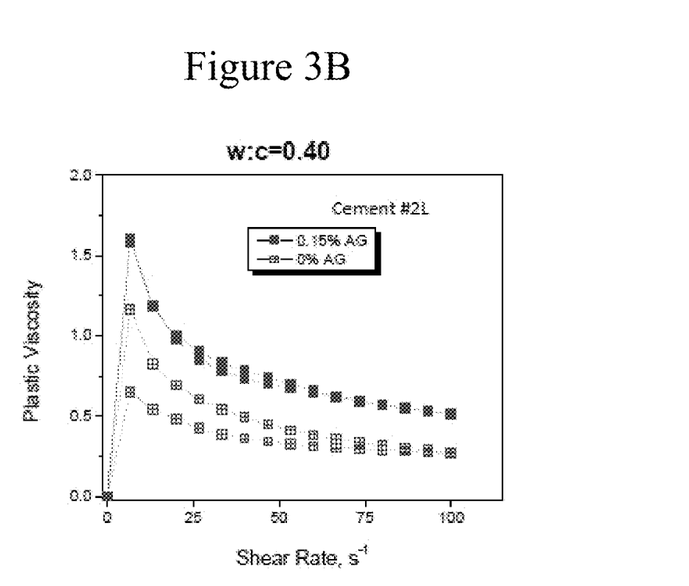
FIG. 3B shows the plastic viscosity v. shear rate for the same compositions as in FIG. 1A.

FIG. 3B shows the plastic viscosity v. shear rate for the same compositions. Although the purified attapulgite (Acti-Gel® 208) treated composition has a higher initial yield point, but the treated composition has a rapid decrease in viscosity and a negligible time lag in returning to the gel microstructure and high yield point. As a result, the Act-Gel® 208 treated concrete forms a stable suspension, has increased pumpability and a rapid green strength.

EXAMPLE 2

The decrease in formwork pressure attainable using a self-compacting concrete (SCC) that is treated with purified attapulgite (Acti-Gel® 208) can be demonstrated. The hydrostatic pressure that SCC creates on formwork is a concern, especially because the SCC usually has no to low yield stress (or very high slump). The fast thixotropic recovery of a treated SCC decreases formwork pressure almost immediately after emplacement, mitigating the need for excessive formwork reinforcement and bracing. The treated SCC is expected to make it possible to achieve rapid development of green strength for shape stability, improved adhesion and greatly improved cohesion, reduction in formwork pressure, or superior anti-washout control.

The treated SCC is expected to make it possible to achieve reduced pump pressure, especially for low-slump concretes, use of coarser aggregate without segregation, reduce or eliminate Si fume, Recovers 'destabilized' mixes, low rebound and dust in spray applications, or greatly improved truck clean-out.

EXAMPLE 3

The following shows that SCC and precast compositions can achieve unsurpassed concrete mix stability, improved surface finish, improved early strength, reduced formwork pressure, and pumpability at low-slump and high coarse aggregate.

A concrete formulation was prepared having a mortar halo and excess surface and edge bleed water. The concrete formulation was treated with purified attapulgite (Acti-Gel® 208) in an amount sufficient to attain 0.1% and 0.2% by dry weight. The mortar halo and water sheen vanished, and the composition became well suspended and had a uniform aggregate suspension. Thus, unsurpassed concrete mix stability is attainable using purified attapulgite.

Similarly, a failed mix of a concrete that was over-dosed with a high-range water reducer admixture (HRWR) was attained. The failed HRWR concrete formulation was treated with purified attapulgite (Acti-Gel® 208) in an amount suf ficient to attain 0.15% dry weight. The resultant HRWR concrete was made usable.

The following compositions were made.

| Raw Materials | Control Lb | AG-Treated lb |
|---|---|---|
| Portland Cement | 300 | 300 |
| Acti-Gel ® 208 | — | 0.15%* |
| Gravel | 850 | 850 |
| Superplasticizer | 14 oz/100w | 14 oz/100w |
| Water | 190 | 190 |

Figure 4A:
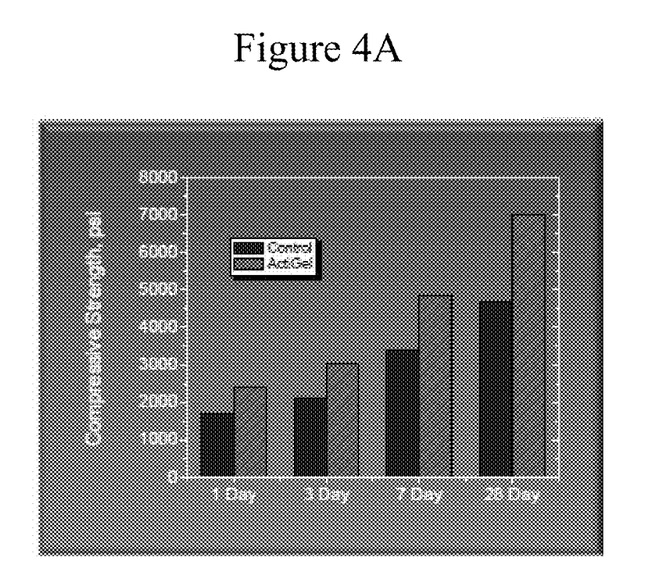
FIG. 4A shows the compressive strength (psi) v. day (1, 3, 7, & 28 days) for a pair of compositions.

The difference between the two compositions is the presence of 0.15% Acti-Gel® 208 based on the dry material weight. The compressive strength (psi) v. day (1, 3, 7, & 28 days) are shown in FIG. 4A. For each day, the Acti-Gel® 208 treated sample (AG-Treated) is shown on the right, and the control is shown on the left. For each day, the compressive strength was greater for the AG-Treated sample.

Figure 4B:
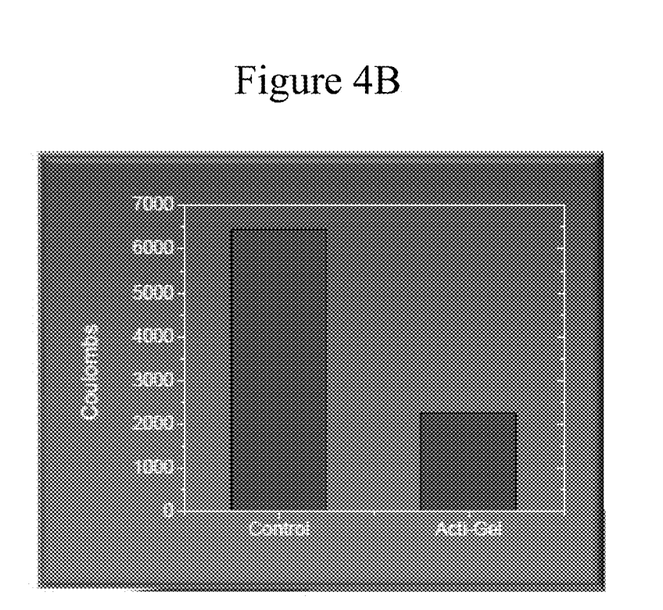
FIG. 4B shows the Coulombs (permeability) v. sample are shown for the compositions in in FIG. 4A.

The Coulombs (permeability) v. sample are shown in FIG. 4B. The Acti-Gel® 208 treated sample (AG-Treated) is shown on the right, and the control is shown on the left. The permeability was less for the AG-Treated sample.

EXAMPLE 4

The following example shows slump flow and J-Ring flow of an SCC. An SCC was prepared with the addition of 0.15% Acti-Gel® 208 based on the dry material weight. The slump flow was determined using ASTM 1611.

| COMPONENT | Control | Acti-Gel ® 208 |
|---|---|---|
| Acti-Gel ® 208 | 0 | 0.20% |
| Portland Cement, lbs | 575 | 575 |
| Class F Fly Ash, lbs | 114 | 114 |
| #67 Coarse Aggregate, lbs | 1574 | 1566 |
| Washed Concrete Sand, lbs | 1420 | 1412 |
| Water, lbs | 285 | 294 |
| Water, Gallons | 34 | 35 |
| Acti-Gel ® 208, lbs | 0 | 7.35 |
| HRWR #1, ozs/100w (cementitious) | 16 | 0 |
| Viscosity Modifier (VMA), oz/100w (cementitious) | 12 | 0 |
| HRWR #2, oz/100w (cementitious) | 0 | 16 |
| Water to Total Cementitious Ratio (Cem + FA) | 0.414 | 0.427 |

Slump Flow: 25.0 in. (ASTM 1611)
$T_{50}$: 2.1 s (time required for flow spread to reach ~20 in. (500 mm))
VSI*=0 Stable Mix·
Visual Stability Index (VSI): assigned by the test operator: score of 3=high segregation; visible mortar halo (worst)
Score of 0=no segregation (best case)

The composition had no mortar halo, a high flowability, no bleeding, good viscosity, excellent aggregate suspension, and high filling ability.

The J-ring flow was determined to be 23.8 in. using ASTM C 1621 indicating good passing ability. The composition had no visible blocking and good passing ability.

A column segregation test was performed to determine the upper and lower section percent difference of an SCC having 16 oz/100 w (cementitious) a commercial VMA (viscosity modifying additive); 0.10% Acti-Gel® 208 and 0.20% Acti-Gel® 208 on a dry weight basis. The following results were obtained and show that Acti-Gel® 208 decreases segregation compared to the commercial VMA.

Column Segregation
(upper/lower section difference, %)
1) Acti-Gel® 208 0.10% dose: 1.1%
2) Acti-Gel® 208 0.15% dose: 0.4%
3) Commercial VMA: 11.8%

The results obtained show that Acti-Gel® 208 decreases segregation compared to the commercial VMA.

EXAMPLE 5

This example concerns precasts and the ability to decrease bugholes. Bugholes are surface voids that result from instability of the concrete resulting in segregation of cement paste away from aggregate and the migration of entrapped air (and/or to a lesser extent water) to the fresh concrete-form interface. These surface defects are more common in vertical surfaces at or near a load bearing region (e.g., the bottom or top of a pillar, etc.). Costly repairs are needed to deal with the problem.

A precast was prepared having 0.075% Acti-Gel® 208 on a dry weight basis. The precast solidified with no bug holes, no segregation, and hard edges. Other amounts of Acti-Gel® 208 produced similar results.

|  | Control | Acti-Gel |
| --- | --- | --- |
| Nat. Sand, lbs.* | 1389 | 1315 |
| #67 Stone, lbs.* | 1526 | 1589 |
| Cement, lbs. | 500 | 550 |
| Fly Ash, lbs. | 225 | 150 |
| W/C Ratio | 0.41 | 0.42 |
| Air Entraining Agent, oz. | 10 | 10 |
| LRWR, oz. | 18 | — |
| HRWR, oz. | 36 | 45 |
| Acti-Gel ® 208 | — | 0.075 |

Using Acti-Gel® 208 made it possible to stop bleed and leaky forms and complicated shapes, such as breakwater armoring stones.

EXAMPLE 6

This example concerns precast mix and design performance. The following precast compositions were made.

| | 40 MPa | | |
| --- | --- | --- | --- |
| | Control | #2 | #3 |
| GP kg/m³ | 330 | 340 | 350 |
| Silica Fume kg/m³ | 30 (9%) | 10 (3%) | 0 |
| Steel/Fibre kg/m³ | 30 | 30 | 30 |
| 20 mm kg/m³ | 1165 | 1165 | 1165 |
| 14 mm kg/m³ | | | |
| 2 mm kg/m³ Fine Sand | 683 | 690 | 690 |
| HRWA mls/m³ | 1440 | 1575 | 1575 |
| LRWR mls/m³ | 1080 | 0 | 0 |
| Retarder mls/m³ | 720 | 700 | 700 |
| Acti-Gel ® 208% | 0 | 0.075 | 0.075 |
| Design Water Ltr | 165 | 165 | 165 |
| W/B ratio Actual | 0.47 | 0.47 | 0.46 |

Figure 5A:
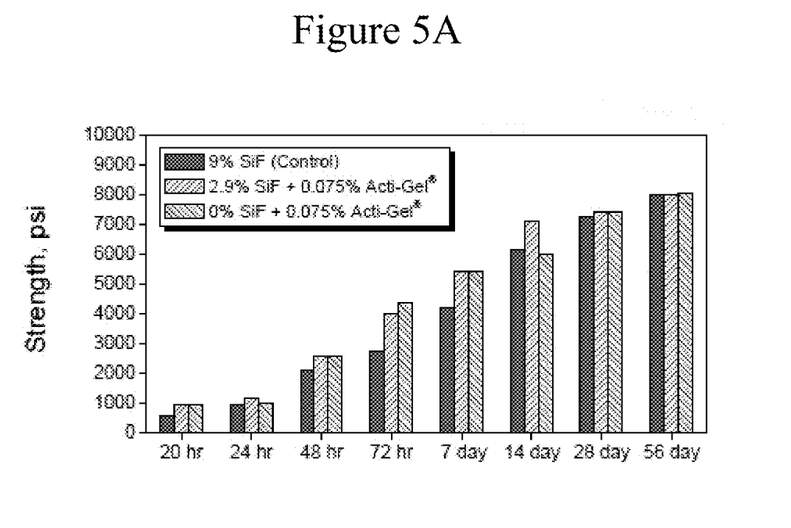
FIG. 5A shows the Strength v. time for exemplified compositions.
Figure 5B:
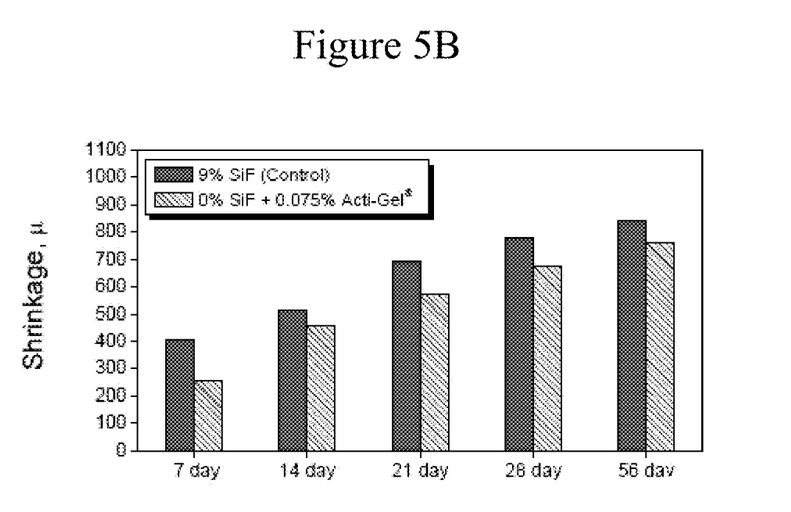
FIG. 5B shows the shrinkage ($\mu m$) v. time for the exemplified compositions.

Notice the silica fume and Acti-Gel® 208 contents. The percentage in the silica fume is a weight percent. FIG. 5A shows the Strength v. time (20 hr, 24 hr, 48 hr, 72 hr, 7 d, 14 d, 28 d, and 56 d) for each composition. FIG. 5B shows the shrinkage (μm) for the control (no Acti-Gel® 208 but silica fume) and precast 3 (Acti-Gel® 208 but no silica fume). Thus, it is possible to eliminate or at least reduce the amount of silica fume while having better workability, greater strength, and reduced shrinkage.

EXAMPLE 7

This example concerns lightweight concrete and pumpability of low slump concrete. The following precast compositions were made.

| | Control | Acti-Gel ® 208 0.05% | Acti-Gel ® 208 0.075% | Acti-Gel ® 208 0.10% |
| --- | --- | --- | --- | --- |
| Mix Design | | | | |
| Fine Aggregate (lb/yd³) | 1365 | 1365 | 1365 | 1365 |
| Coarse Aggregate (lb/yd³) | 989 | 989 | 989 | 989 |
| Cement (lb/yd³) | 658 | 658 | 658 | 658 |
| Water (lb/yd³) | 241 | 241 | 241 | 241 |
| HRWR (oz/yd³) | 24 | 24 | 45 | 45 |
| Air Entrainer (oz/yd³) | 2 | 2 | 2 | 2 |
| VMA (oz/yd³) | 20 | 0 | 0 | 0 |
| Acti-Gel ® 208 (lb/yd³) | 0 | 1.50 | 2.25 | 3.00 |
| Fresh Concrete Properties | | | | |
| Tests | | | | |
| Acti-Gel ® 208 mixing time | 0 | 5 mins | 5 mins | 5 mins |
| Slump Before Acti-Gel ® 208 (in) | 7 | n/a | 10 | 10.75 |
| Slump After Acti-Gel ® 208 (in) | n/a | 6 | 9.25 | 8.75 |
| Slump After Pumping (in) | 6.75 | 2.25 | 4.5 | 4.5 |
| Temperature Concrete (° F.) | 58 | 59 | 59 | 60 |
| Temperature Ambient (° F.) | 41 | 41 | 44 | 46 |
| Air (%) | 8 | 7 | 8 | 6.75 |
| Density (lbs/ft³) | 115.6 | 119.6 | 118.4 | 118.8 |
| Pump Pressure (psi) | 3100 | 4100 | 2900 | 3050 |
| Relative pump pressure (to the control) | 1.0 | 1.3 | 0.94 | 0.99 |

The fresh concrete properties are shown below the compositions. Notice that the control has 6.75 inch post-pumping slump while the 0.075% Acti-Gel® 208 concrete has a 4.5 inch post-pumping slump. The pump pressure for the control compared to that of the 0.075% Acti-Gel® 208 concrete is 6.4% greater translating into energy savings for low slump concretes.

EXAMPLE 8

The following test concerns shotcrete and its surface adhesion, rebound and strength. The following shotcrete composition was made (volume is per yrd³).

| Ingredient | control | AG-Treated |
| --- | --- | --- |
| Type I/II L.A. Cement, lbs. | 532 | 532 |
| Class F Fly ash, lbs. | 133 (20%) | 133 |
| ⅜" Coarse Aggregate, lbs. (SSD) | 1115 | 1115 |
| Washed Concrete Sand, lbs. (SSD) | 665 | 665 |
| Water, lbs. | 285 | 285 |
| Acti-Gel ® 208, lbs. (treated mixture only) | | 6.5 (0.2%) |
| BASF Polyheed 997, MRWR, oz. | 44.0 | 44.0 |
| BASF Micro-Air, AEA, oz. | 6.0 | 6.0 |

Two wooden unreinforced panels (4'×4'×4") were placed at a 45° angle on a plastic sheeting to collect any rebound material. A 2-cubic yard batch of a shotcrete composition was propelled through a hose onto the surface of the wooden panels.

| Parameter | Control | AG-Treated | Difference |
|---|---|---|---|
| W:C (water to cementitious Ratio) | 0.429 | 0.429 | |
| Slump (in) | 2.5 | 2 | |
| Rebound weight (lbs) | 14.32 | 4.18 | −71% |
| Air content % (calculated) | 6 | 5.70 | |
| Unit weight (pcf) | 138.7 | 139.2 | |
| Concrete temperature (F.) | 61.2 | 60.8 | |
| Ambient relative humidity % | 29.9 | 27.7 | |
| Ambient temperature (F.) | 55 | 50.3 | |
| 7-day cylinder strength (psi) | 4,110 | 4,810 | 17% |
| 14-day cylinder strength (psi) | 4,760 | 5,880 | 24% |
| 28-day cylinder strength (psi) | 5,480 | 6,320 | 15% |
| 14-day core strength (psi) | 5,250 | 6,910 | 32% |
| 28-day core strength (psi) | 5,520 | 7,350 | 33% |

The rebound weight dropped by 71% for the AG-Treated shotcrete. Also, the 28-day cylinder strength was 15% greater for the AG-Treated shotcrete. And the 28-day core strength was 33% greater for the AG-Treated shotcrete.

This and other examples known to the inventors show that early age strength is achievable by adding Acti-Gel® 208 to a shotcrete formulation.

Figure 6A:
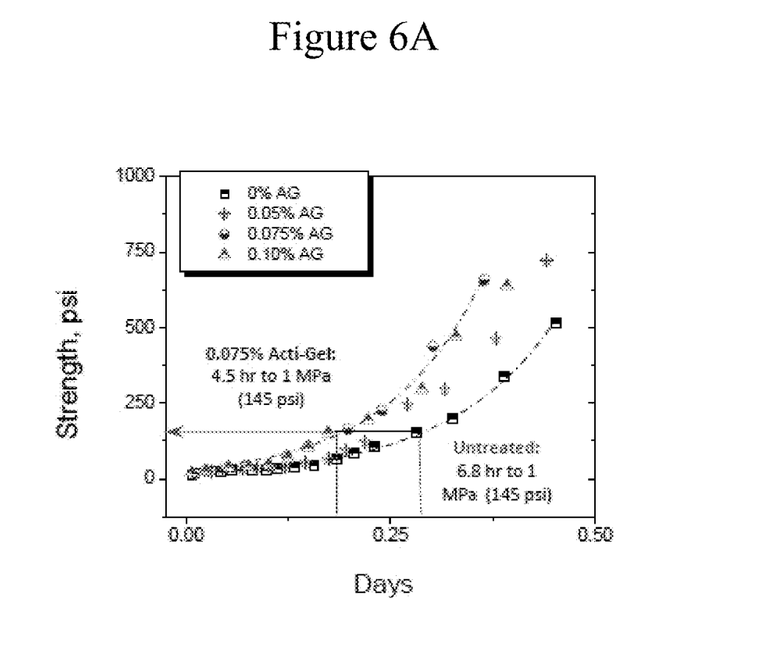
FIG. 6A shows the strength v. time for the exemplified compositions.

For example, FIG. 6A shows the strength (PSI) v. time for a concrete. Formulations without Acti-Gel® 208 (0% AG) take 6.8 hours to reach 1 MPa. Formulations with Acti-Gel® 208 (0.05% AG, 0.075% AG, & 0.10% AG) take as little as 4.5 hours (0.075% AG) to reach 1 MPa.

Figure 6B:
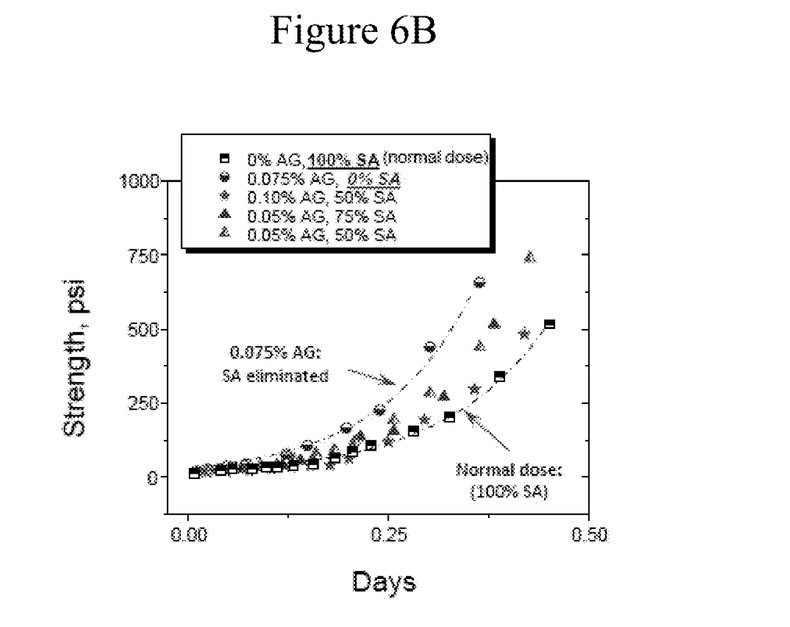
FIG. 6B shows the shrinkage for the exemplified compositions.

For Example, FIG. 6B shows the strength (PSI) v. time for a concrete. Formulations without Acti-Gel® 208 but with a set accelerator (0% AG/100% SA) take longer to reach 1 MPa that formulations Acti-Gel® 208 and varying amounts of a set accelerator (0.05% AG/50% SA, 0.05% AG/75% SA, & 0.10% AG/50% SA). The formulation with Acti-Gel® 208 but without a set accelerator (0.075% AG/0% SA) reach 1 MPa the fastest.

Acti-Gel® 208 addition results in less time to achieve strength of 1 MPa, thus permitting earlier re-entry. Acti-Gel® 208 made it possible to eliminate or reduce the amount of a set accelerator.

EXAMPLE 9

This and other examples known to the inventors show that an 11 inch buildup of shotcrete on a vertical surface is possible by adding Acti-Gel® 208 to a shotcrete formulation.

Similarly, a dry mix of gunite is made and wetted before application on an overhead surface. The presence of Acti-Gel® 208 makes it possible for superior cohesion and adhesion, which is not expected from a dry (gunite) mix and related applications.

This and other examples known to the inventors show that reduction of dust in spray applications of shotcrete is possible by adding Acti-Gel® 208 to a shotcrete formulation.

The following Standard Mix of Shot-Crete and one with Acti-Gel® 208 were made and surface area sprayed to meshed hard rock. The inhalable dust was measured. The presence of Acti-Gel® 208 makes it possible for less inhalable dust (12.50 mg/m¬3) than the Standard mix, which lacks Acti-Gel® 208.

| Acti-Gel ® 208 Shot-Crete Underground Trials Surface Area Sprayed - Meshed Hard Rock | | |
|---|---|---|
| TESTS CONDUCTED | Standard Mix | Acti-Gel ® 208 Mix-No Silica Fume |
| Slump at Transfer Pad (mm) | 120 | 120 |
| Slump at Pump Prior to Spraying (mm) | 120 | 120 |
| Concrete Temperature at Pump (° C.) | 30 | 30 |
| Accelerator Dosage | 20 ltrs/m3 (5 ltrs/min or 5%) | 20 ltrs/m3 (5 ltrs/min or 5%) |
| Re-Entry (Time Taken to Reach 1 MPa) (Hr) | 1.8 | <1.0 |
| Rebound (%) | 9.6 | 4.6 |
| Dust Monitoring Results | | |
| Inhalable Dust Results (mg/m³) Air | 30.90 | 12.50 |
| Strength Testing Results | | |
| Cylinder Results - 7 Days (MPa) | 32.5 | 40.0 |
| Cores No ACC- 7 days (MPa) | 42.5 | 40.2 |
| Cores With ACC- 7 days (MPa) | 19.0 | 40.8 |
| Cylinder Results- 28 Days (MPa) | 36.5 | 47.0 |
| Cores No ACC - 28 days (MPa) | 56.8 | 52.5 |
| Cores With ACC- 28 days (MPa) | 33.8 | 50.5 |
| Round Panels | Joules, 382.5- kN 25.0 | Joules, 351- kN 30.8 |
| Comments | Standard design | Silica Fume removed, Acti-Gel ® 208 added at 1.5 kg per m³. 10 kg of OPC was added to offset the S/F. |

This and other examples known to the inventors show that superior cohesion is possible by adding Acti-Gel® 208 to a shotcrete formulation.

EXAMPLE 10

This example concerns concrete for deep foundations. The following tremie concrete compositions were made.

| Ingredient | Control | AG-Treated |
|---|---|---|
| GP | 247 | 247 |
| F/Ash (25%) | 113 | 113 |
| GGBFS (20%) | 90 | 90 |
| Silica | 0 | 0 |
| Total Binder | 450 | 450 |
| BNL 20 mm | 600 | 750 (+25%) |
| BNL 14 mm | 0 | 0 |
| BNL 10 mm | 300 | 370 |
| BNL 7 mm | 0 | 0 |
| BNL M/sand | 415 | 305 (−27%) |
| Lytton F/sand | 415 | 305 (−27%) |
| Total Aggregate | 1730 | 1730 |
| Total dry component | 2180 | 2180 |
| Acti-Gel ® 208 | 0 | 1.6 kg (0.075%) |
| Water | 180 | 166 |
| W/C Ratio | 0.400 | 0.369 |
| Spread (mm) | — | 420 |
| Bauer Filtration Liquid | 16.6 ml | 6.2 ml (−63%) |

Only coarse and fine aggregates along with admixture were adjusted in the AG-Treated composition. All cementitious material was constant relative to the control. The AG-Treated composition was a stable, lean mix with no bleed and improved strength. The results are shown in FIG. 7A-B.

Figure 7A:
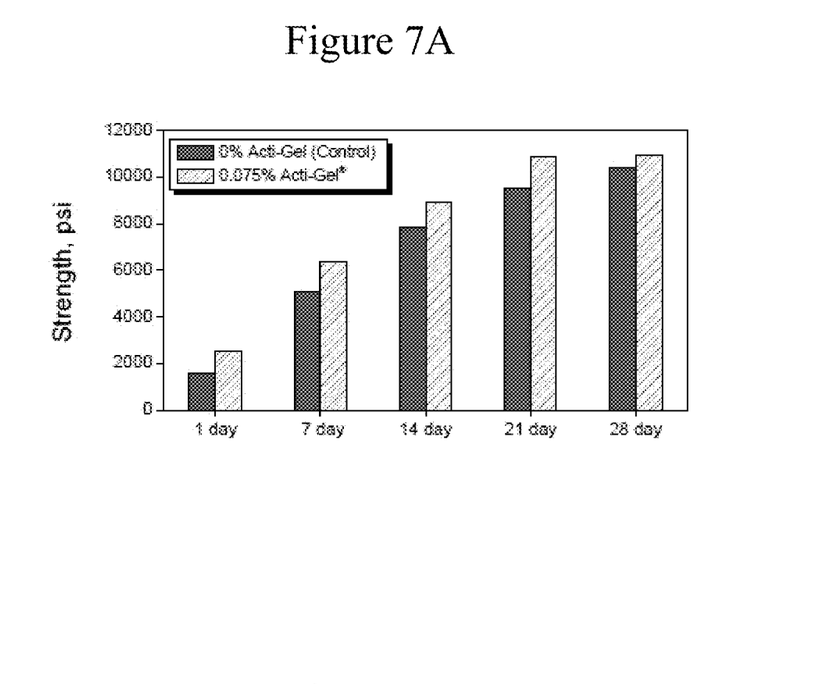
FIG. 7A shows the Strength v. time for exemplified compositions.
Figure 7B:
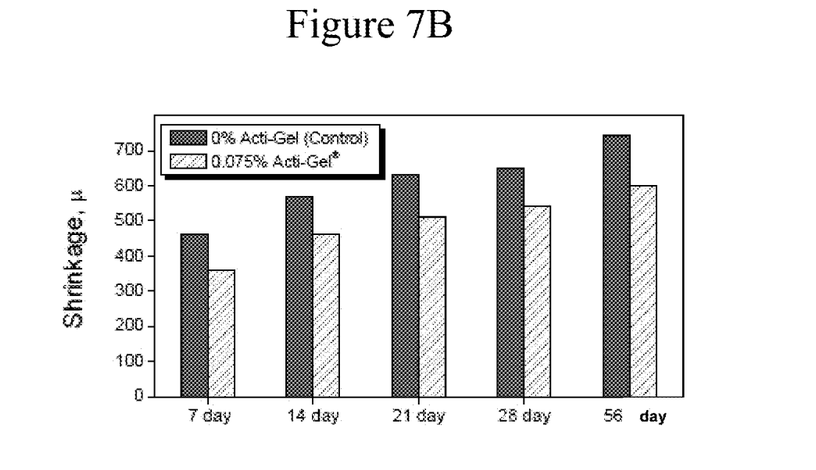
FIG. 7B shows the shrinkage for the exemplified compositions.

FIG. 7A shows the Strength v. time (1 d, 7 d, 14 d, 21 d, and 28 d) for each composition. FIG. 7B shows the shrinkage (μm) for the control (no Acti-Gel® 208) and AG-Treated composition (Acti-Gel® 208) at 7, 14, 21, 28, and 56 days. Thus, it is possible to have an ordinary Portland cement (OPC) and high supplementary cementing materials (SCM) content with better workability, greater strength, and reduced shrinkage.

This and other examples known to the inventors show that paste densification and substantial reduction in macroporosity is possible by adding Acti-Gel® 208 to a concrete formulation.

This and other examples known to the inventors show that anti-washout is possible by adding Acti-Gel® 208 to a concrete formulation.

This and other examples known to the inventors show that reduced bleed under hydrostatic pressure is possible by adding Acti-Gel® 208 to a concrete formulation.

This and other examples known to the inventors show that higher green strength is possible by adding Acti-Gel® 208 to a concrete formulation.

This and other examples known to the inventors show that high shape stability, improved surface finish, or reduced incline friction is possible by adding Acti-Gel® 208 to a concrete formulation.

EXAMPLE 11

The following compositions were made to test the mitigation of concrete volume expansion resulting from the Alkali-Silicate Reaction (ASR) using compositions with and without Acti-Gel® 208.

| MIXTURE CONSTITUENTS | | | | | | |
| --- | --- | --- | --- | --- | --- | --- |
|  | CONTROL | Mix 1 | Mix 2 | Mix 3 | Mix 2A | Mix 3A |
| Graded Aggregate | 990 | 990 | 990 | 990 | 990 | 990 |
| Cement | 440 | 330 | 436.7 | 326.7 | 436.7 | 326.7 |
| Water | 206.8 | 206.8 | 206.8 | 206.8 | 204.8 | 204.8 |
| Class F Fly Ash | 0 | 110 | 0 | 110 | 0 | 110 |
| Acti-Gel ® 208 | 0 | 0 | 3.3 | 3.3 | 3.3 | 3.3 |
| BASF 7500 HRWRA | 0 | 0 | 0 | 0 | 2 | 2 |
| Flow, mm | 162 | 155 | 138 | 128 | 166 | 172 |
| Flow Variance from Control, % |  | −4.32 | −14.81 | −20.99 | 2.47 | 6.17 |

Figure 8:
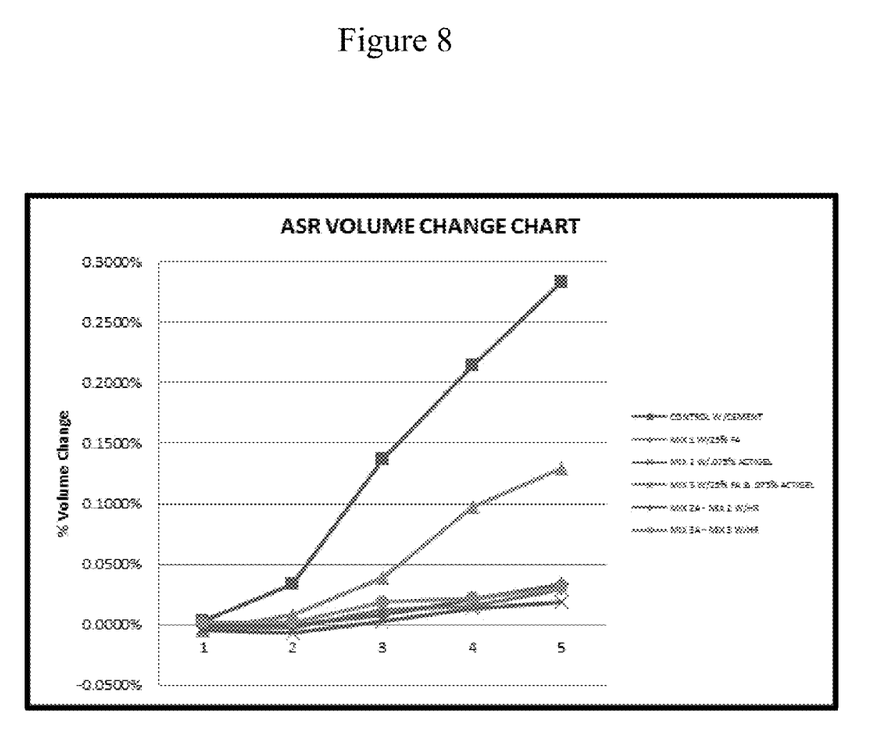

This and other examples known to the inventors show that mitigation of concrete volume expansion resulting from Alkali-Silicate Reaction (ASR) is possible by adding Acti-Gel® 208. Results are shown in FIG. 8 and indicate that a control (untreated) mortar/cement exhibits 0.281% volume expansion at measurement Day 16 (5$^{th}$ data point), whereas Acti-Gel® 208-treated mortars (Mix 2, 2A, 3, and 3A) had negligible volume expansion. Mix 1 with 25% by weight of a Class F fly ash added as a conventional ASR treatment, was only marginally effective in reduced expansion.

Other embodiments of the invention will be apparent to those of ordinary skill in the art from consideration of the specification and practice of the embodiments disclosed herein. It is intended that the specification and examples be considered as nonlimiting, with a true scope and spirit of the invention being indicated by the following claims.

What is claimed is:

1. A composition, comprising:
   one or more cementitious binder materials present in an amount ranging from 0.5% to 75% by dry weight of the composition; and
   purified attapulgite substantially free of non-attapulgite minerals present in an amount ranging from 0.01% to 1.00% by dry weight of the composition.

2. The composition of claim 1, wherein the composition further comprises water in an amount ranging from 0.2 to 0.7 W/C, wherein W is the mass of the water, and wherein C is the dry mass of the one or more cementitious binder materials.

3. The composition of claim 2, wherein the amount W/C ranges from 0.35 to 0.60.

4. The composition of claim 1, wherein the composition is in the form selected from the group consisting of concrete, cement paste, and mortar.

5. The composition of claim 1, wherein the purified attapulgite substantially free of non-attapulgite minerals is present in an amount ranging from 0.02% to 0.7% by weight of the composition.

6. The composition of claim 1, wherein the purified attapulgite substantially free of non-attapulgite minerals is present in an amount ranging from 0.03% to 0.15% by weight of the composition.

7. The composition of claim 1, wherein the purified attapulgite substantially free of non-attapulgite minerals is present in an amount ranging from 0.075% to 0.20% by dry weight of the composition.

8. The composition of claim 5, wherein the one or more cementitious binder materials are present in an amount ranging from 0.5% to 75% by weight of the composition.

9. The composition of claim 1, wherein the one or more cementitious binder materials are selected from the group consisting of from Portland cements and lime.

10. The composition of claim 1, further comprising one or more aggregates present in an amount ranging from 10% to 80% by weight of the dry components.

11. The composition of claim 1, further comprising one or more admixtures present in an amount ranging from 0.02% to 4% by weight of cementitious material.

12. The composition of claim 1, wherein the one or more cementitious binder materials further comprise one or more supplementary cementitious materials.

13. A method of making a composition, comprising
   mixing (a) one or more cementitious materials; and
   (b) purified attapulgite substantially free of non-attapulgite minerals;
   to form a resultant composition;
   wherein the (a) one or more cementitious binder materials present in an amount ranging from 0.5% to 75% by dry weight of the composition;
   wherein the (b) the purified attapulgite substantially free of non-attapulgite minerals is present in an amount ranging from 0.01% to 1.00% by dry weight of the composition.

14. The method of claim 13, further comprising mixing water in an amount ranging from 0.2 to 0.7 W/C, wherein W is the mass of the water, and wherein C is the dry mass of the one or more cementitious binder materials.

15. The method of claim 13, wherein the composition is free from a setting agent.

16. A method of making a composition, comprising
(1) mixing (a) one or more cementitious materials; and
(b) purified attapulgite substantially free of non-attapulgite minerals; and
(c) water an amount ranging from 0.2 to 0.7 W/C, wherein W is the mass of the water, and wherein C is the dry mass of the one or more cementitious binder materials
to form a resultant composition; and
(2) spraying the resultant composition in a shotcrete process to make a structure;
wherein the (a) one or more cementitious binder materials present in an amount ranging from 0.5% to 75% by dry weight of the composition;
wherein the (b) purified attapulgite substantially free of non-attapulgite minerals present in an amount ranging from 0.01% to 1.00% by dry weight of the composition.

17. The method of claim 16, wherein the shotcrete process is a wet-mix shotcrete process.

18. The method of claim 16, wherein the shotcrete process is a dry-mix shotcrete process.

19. The method of claim 16, further comprising building up 10 inches or more of shotcrete on a vertical surface.

20. The composition of claim 1, further comprising silica fume in an amount less than 10% by weight of the cementitious binder materials.

* * * * *